United States Patent [19]

Kumagai et al.

[11] Patent Number: 4,516,545
[45] Date of Patent: May 14, 1985

[54] APPARATUS FOR CONTROLLING THE ROLLING OF AN ENGINE

[75] Inventors: Naotake Kumagai, Aichi; Minoru Tatemoto, Okazaki; Itoh: Yoji, Nagoya; Tokushige Inuzuka, Okazaki, all of Japan

[73] Assignee: Mitsubishi Jidosha Kogyo Kabushiki Kaisha, Tokyo, Japan

[21] Appl. No.: 598,041

[22] Filed: Apr. 9, 1984

[30] Foreign Application Priority Data

| Apr. 15, 1983 | [JP] | Japan | 58-56182[U] |
| Apr. 15, 1983 | [JP] | Japan | 58-56184[U] |
| Apr. 15, 1983 | [JP] | Japan | 58-56185[U] |
| Apr. 15, 1983 | [JP] | Japan | 58-56187[U] |
| Apr. 15, 1983 | [JP] | Japan | 58-56188[U] |

[51] Int. Cl.$^3$ ............................ F16F 9/04; F16M 5/00
[52] U.S. Cl. .......................... 123/192 R; 123/195 A; 180/312; 248/550; 248/566; 248/636; 188/378; 188/298; 188/285
[58] Field of Search .......... 123/195 R, 195 A, 198 E, 123/192 R, 192 B; 180/312, 300; 248/550, 560, 566, 636; 188/378, 299, 298, 285

[56] References Cited

U.S. PATENT DOCUMENTS

| 4,351,515 | 9/1982 | Yoshida | 248/562 |
| 4,391,435 | 7/1983 | Pham | 248/636 |
| 4,428,569 | 1/1984 | Takei | 248/636 |

FOREIGN PATENT DOCUMENTS

| 2833776 | 1/1980 | Fed. Rep. of Germany | 180/312 |
| 2916616 | 11/1980 | Fed. Rep. of Germany | 180/300 |
| 3142673 | 5/1983 | Fed. Rep. of Germany | 180/312 |
| 138424 | 8/1982 | Japan | 180/312 |

Primary Examiner—Craig R. Feinberg
Assistant Examiner—David A. Okonsky
Attorney, Agent, or Firm—Birch, Stewart, Kolasch & Birch

[57] ABSTRACT

When detecting means detects that changes have been achieved by an automatic transmission in lever position and/or gear position, a solenoid drive circuit is actuated for a predetermined period of time to drive shock absorbers which control the rolling of the engine of an automobile. More specifically, when it is actuated, the solenoid drive circuit energizes solenoids, whereby the rotary valves of the shock absorbers are rotated for said period. As a result, one of the two orifices of either shock absorber is closed, thus increasing the force damping the vibrations of the engine. Hence, the vibrations caused by a large torque of the engine are not transmitted to the chassis of the automobile.

10 Claims, 8 Drawing Figures

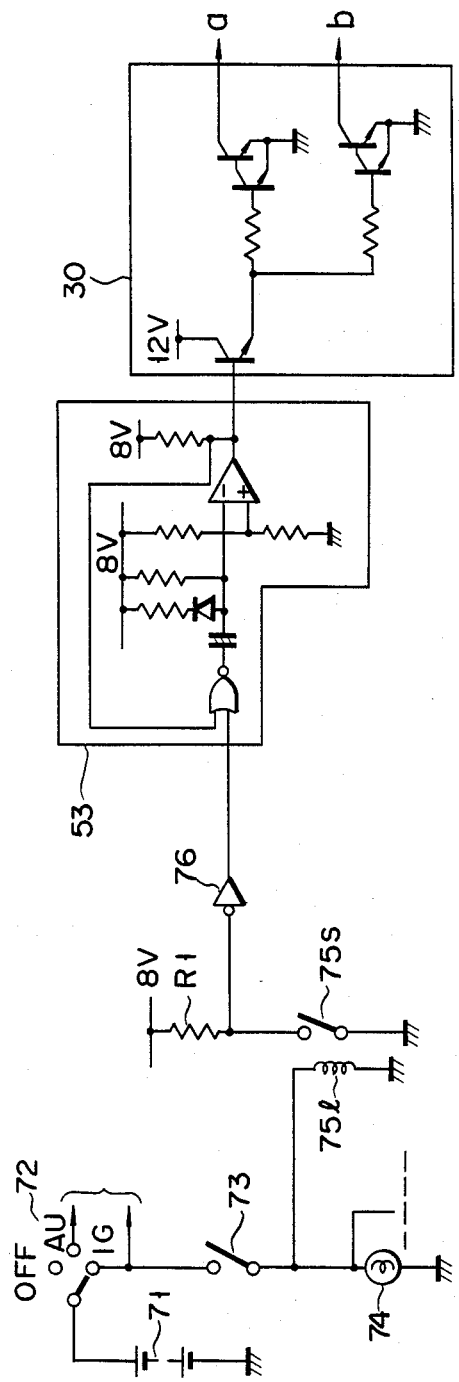
F I G. 7

APPARATUS FOR CONTROLLING THE ROLLING OF AN ENGINE

BACKGROUND OF THE INVENTION

The present invention relates to an apparatus for electronically controlling the rolling of an automobile engine.

Recently, automobiles whose engines are equipped with an automatic transmission have been widely used. With an automobile of this type, the engine generates widely different torques when the engine is idle, when the car runs at normal speed and when the transmission is switched to a different mode. When the engine is idle or when the car runs at normal speed, the engine produces a small torque, and vibrates at a high frequency and at a low amplitude. When the transmission commences a different operation, the engine produces a noticeably large torque, and vibrates at a low frequency and at a high amplitude. If the vibrations are transmitted to the chassis, no comfort can be guaranteed to the driver or the passengers. Hence, a shock absorber is provided between the engine and the chassis to reduce the torque transmitted to the chassis, thereby increasing the occupants' comfort. The conventional shock absorber can indeed absorb high-frequency, low-amplitude vibrations, but fails to absorb low-frequency, high-amplitude vibrations. Consequently, engine vibrations are undesirably transmitted to the chassis, failing to give the occupants a comfortable ride.

SUMMARY OF THE INVENTION

It is accordingly the object of this invention to provide an apparatus to electronically control the rolling of an automobile engine which arises when the transmission is switched to a different mode.

According to the invention, there is provided an apparatus which electronically controls the rolling of an automobile engine. The apparatus comprises:

detecting means for detecting that changes have been achieved by an automatic transmission in lever position and/or gear position;

engine-roll control means for controlling the rolling of the engine;

a drive mechanism for driving the engine-roll control means; and a drive circuit for actuating the drive mechanism for a predetermined period of time in response to an output signal from the detecting means.

BRIEF DESCRIPTION OF THE DRAWINGS

FIG. 7 shows the control circuit of still another engine-roll control apparatus according to this invention.

DETAILED DESCRIPTION OF THE PREFERRED EMBODIMENTS

Figure 1:
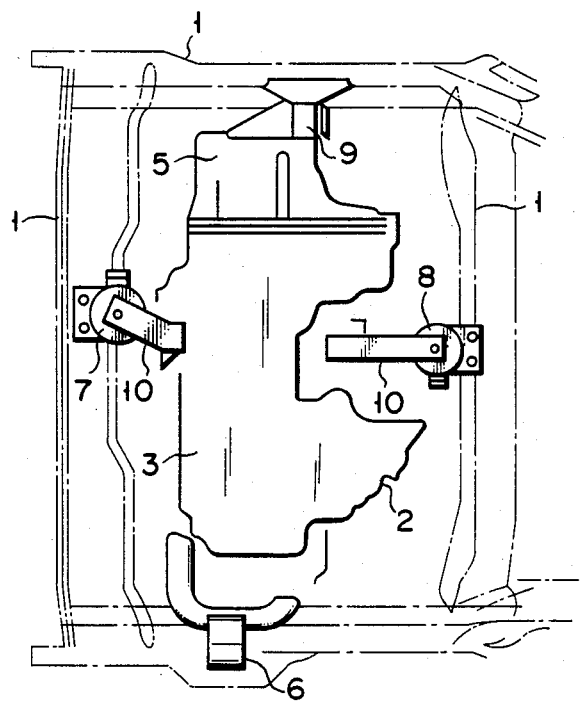
FIG. 1 shows that section of a forward-engine front-wheel drive automobile (hereinafter called "an FF car") in which an engine is arranged.
Figure 2:
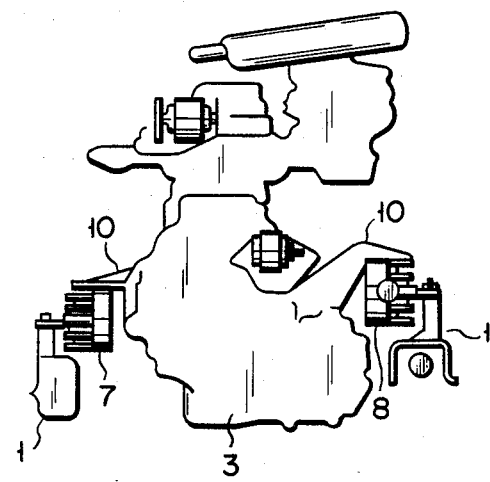
FIG. 2 is a side view of the section shown in FIG. 1.

An engine-roll control apparatus embodying this invention may now be described with reference to the accompanying drawings. FIGS. 1 and 2 show a power device 2 mounted on a chassis 1. The power device 2 comprises an engine 3 and an automatic transmission 5. The engine 3 is supported through arms 10 thereof by first and second shock absorbers 7, 8, an engine mount 6 and a transmission mount 9. The shock absorbers 7 and 8 are usually called "front rolling stopper" and "rear rolling stopper", respectively. They have the same structure, but the operation of only an exemplary first shock absorber such as 7 will be described with reference to FIG. 3.

Figure 3:
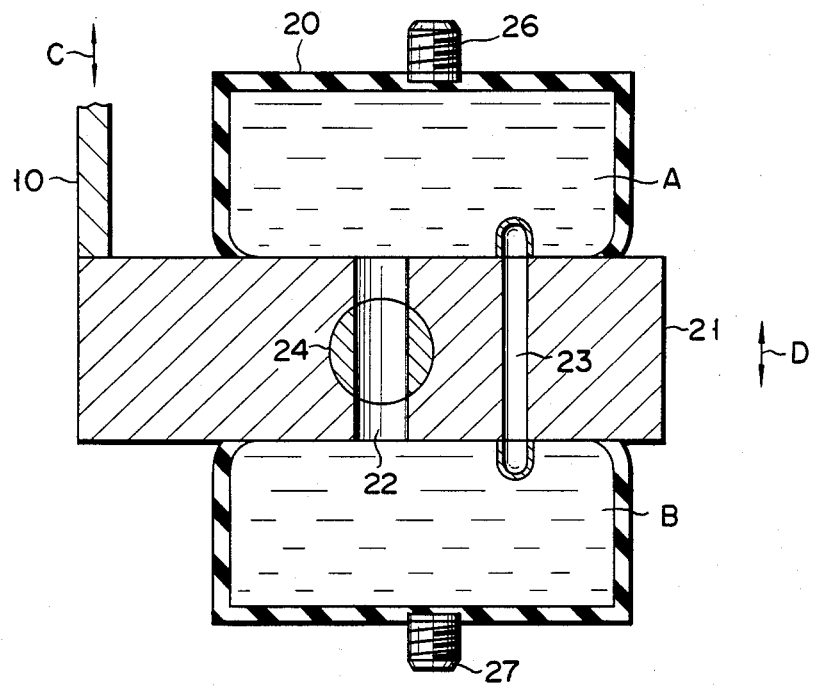
FIG. 3 explains how a shock absorber used in this invention operates.

As shown in the diagrammatic explanatory view of FIG. 3, a shock absorber such as 7 comprises a casing 20 made of elastic material. The casing 20 is divided by a partition 21 into two chambers A and B. The chambers A, B are filled with operation oil. The partition 21 has two through holes, or first and second orifices 22, 23. The first orifice 22 has an inner diameter much larger than that of the second orifice 23. A rotary valve 24 is provided in the first orifice 22. When a solenoid (not shown) is energized, the valve 24 is turned to an angle of 90°, thereby closing the first orifice 22. A diagrammatically illustrated arm 10 is connected at one end to engine 3 and at the other to the partition 21. It moves in the direction of arrow C when the engine 3 understandably moves back and forth. The walls of the chambers A, B which face the partition 21 are secured to the chassis 1 by diagrammatically illustrated screws 26, 27. When the engine 3 happens to move back and forth due to any kind of shock, the partition 21 similarly moves back and forth in the direction of arrow D. If, in this case, the rotary valve 24 is rotated, thus closing the first orifice 22, the operation oil will flow from the chamber A to the chamber B, and vice versa, only through the second orifice 23. As a result, greater pressure is applied to the partition 21. This lessens the motion of the partition wall 21 in the direction of arrow D. Consequently, it is possible to suppress the similar motion of the engine 3 which is connected by the arm 10 to the partition 21 and thus moves interlockingly with the partition 21. In contrast, when the rotary valve 24 is rotated, thus opening the first orifice 22, the oil runs through both orifices 22 and 23. In this case, the partition 21 undergoes no high pressure and therefore smoothly moves in conformity to the back-and-forth motion of the engine 3.

Figure 4:
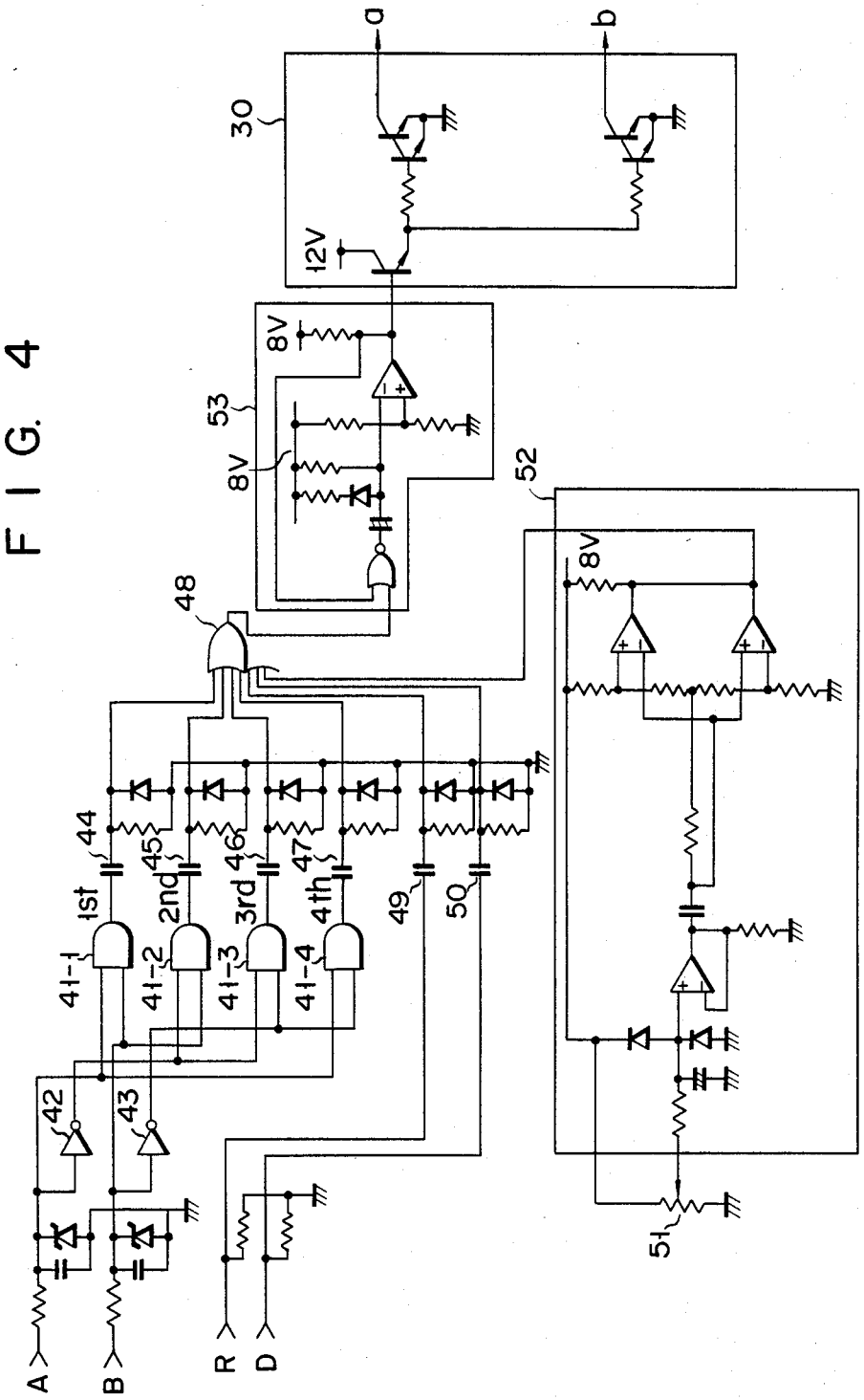
FIG. 4 shows the control circuit of an engine-roll control apparatus according to this invention.

FIG. 4 shows a control circuit used in a first embodiment of the present invention. As shown in this figure, signals, A and B are supplied to two solenoids connected to an automatic electronic transmission controller (not shown). The transmission changes from one of four gear positions to another in accordance with the levels of these signals A and B. When both signals A and B are at a high level, the controller selects the first gear position. When the signals A and B are at low and high levels, respectively, it selects the second gear position. When both signals A and B are at a low level, it selects a third gear postion. When the signals A and B are at high and low levels, respectively, it selects the fourth gear position. Which gear position the controller selects is detected by checking the levels of the signals A, B. The signal A is supplied to AND gates 41-1 and 41-4 directly and to AND gates 41-2 and 41-3 through an inverter 42. The signal B is supplied to the AND gates 41-1 and 41-2 directly and to the AND gates 41-3 and 41-4 via an inverter 43. Outputs from the AND gates 41-1 to 41-4 are supplied to an OR gate 48 via the capacitors 44 to 47, respectively. A signal R, which is set at a high level when the selector lever (not shown) of the transmission controller takes the R (reverse) position, is supplied to the OR gate 48 through a capacitor 49. A signal D, which becomes high when the selector lever assumes the D (drive) position, is supplied to the OR gate 48 through a capacitor 50. An accelerator pedal angle sensor 51 is used to detect the angle of the accelerator pedal. Output from this sensor 51 is supplied to an accelerator depressing speed detecting circuit 52. The circuit 52 generates a signal at a high level when the accelerator depressing speed, at which the accelerator opening is changed, exceeds a predetermined value. Hence, when the driver quickly depresses the accelerator pedal, the circuit 52 generates a high-level signal. This high-level signal is supplied to the OR gate 48. The OR gate 48 supplies a signal to a timer circuit 53. Upon receipt of this signal, the circuit 53 generates a high-level signal for a predetermined period of time. The high-level signal from the circuit 53 is supplied to a solenoid drive circuit 30. The cirucit 30 supplies the solenoid drive signal a to the shock absorber 7 (FIG. 1) and the solenoid drive signal b to the shock absorber 8. In response to the high-level signal, the solenoid drive circuit 30 outputs the signals a and b.

The control circuit shown in FIG. 4 operates in the following manner. Suppose the electronic automatic transmission controller changes from one of the four gear positions to another, and the selector lever is set at the R or D position. When the accelerator pedal is depressed under this condition at a speed below a predetermined value, all the signals supplied to the OR gate 48 are at a low level. The timer circuit 53 therefore receives a low-level signal. This low-level signal is supplied to the solenoid drive circuit 30. The circuit 30 outputs neither signal a nor signal b. In this case, both orifices 22 and 23 of either shock absorber (FIG. 1) are opened, so that the damping force on the back-and-forth motion of the engine 3 is small. Nonetheless, this force is large enough to absorb the vibrations of the engine 3 which are small since the accelerator pedal has been depressed at a relatively low speed. As a result, the vibrations are not transmitted to the chassis 1.

Whenever the electronic automatic transmission controller changes from one of the four gear positions to another, one of the AND gates 41-1 to 41-4 outputs a high-level signal. More specifically, when the controller selects the first gear position, the AND gate 41-1 outputs a high-level signal; when it selects the second gear position, the AND gate 41-2 outputs a high-level signal; when it selects the third gear position, the AND gate 41-3 outputs a high-level signal; and when it selects the fourth gear position, the AND gate 41-4 outputs a high-level signal. In any case, the high-level signal is supplied to the timer circuit 53. The timer circuit 53 generates a high-level signal for a predetermined period of time. Therefore, the solenoid drive circuit 30 generates signals a and b for this perioid of time. Hence, each time the electronic automatic transmission controller changes from one gear position to another, the first orifice 22 of either shock absorber (FIG. 1) is closed. As a result, the force damping the back-and-forth motion of the engine 3 increases. Hence, the damping forces of both shock absorbers 7, 8 become great enough to absorb the vibrations of the engine 3. As a result, the chassis 1 does not vibrate in spite of the large torque the engine 3 has produced.

When the selector lever changes to R or D position, the signal R or D becomes high. This high-level signal is supplied from the OR gate 48 to the timer circuit 53. Therefore, the circuit 53 generates a high-level signal for a predetermined period of time. The solenoid drive circuit 30 outputs signals a and b for this period of time. In brief, when the selector lever is changed to R or D position, the first orifice 22 of either shock absorber is closed, thus increasing the damper effect on the back-and-forth motion of the engine 3. The damping forces of the shock absorbers 8 and 7 are large enough to absorb the vibrations of the engine 3. Hence, the chassis 1 does not vibrate in spite of the large torque the engine 3 has made.

When the accelerator pedal is depressed at a speed over the predetermined value, the accelerator depressing speed detecting circuit 52 generates a high-level signal. Upon receipt of this signal, the timer circuit 3 generates a high-level signal, which is supplied to the solenoid drive circuit 30. The circuit 30 generates signals a and b for a predetermined period of time.

When the accelerator depressing speed reaches the predetermined value, the first orifice 22 of either shock absorber (FIG. 1) is closed. The damper effect on the back-and-forth motion of the engine 3 becomes large. The damping forces of both shock absorbers 7 and 8 therefore increase. In other words, when the accelerator pedal is depressed at a speed over the predetermined value, the damping forces of the shock absorbers 7 and 8 become great enough to absorb the vibrations of the engine 3. The vibrations are not transmitted to the chassis 1, although a large torque has been produced by the engine 3.

In the first embodiment of FIG. 4, the engine 2 neither greatly moves relative to the chassis 1 nor bumps into other devices within the engine room or the car body, even if a large torque reaction occurs when the selector lever is moved to the R or D position, when the electronic automatic transmission controller performs its function, or when the accelerator pedal is depressed at a speed over the predetermined value. As long as the engine torque reaction is small, the shock absorbers 7 and 8 are not driven. In this case, the vibrations of the engine 3 are absorbed by the engine mount 6 and transmission mount 9, which are made of soft rubber. This ensures comfortable driving.

Figure 5:
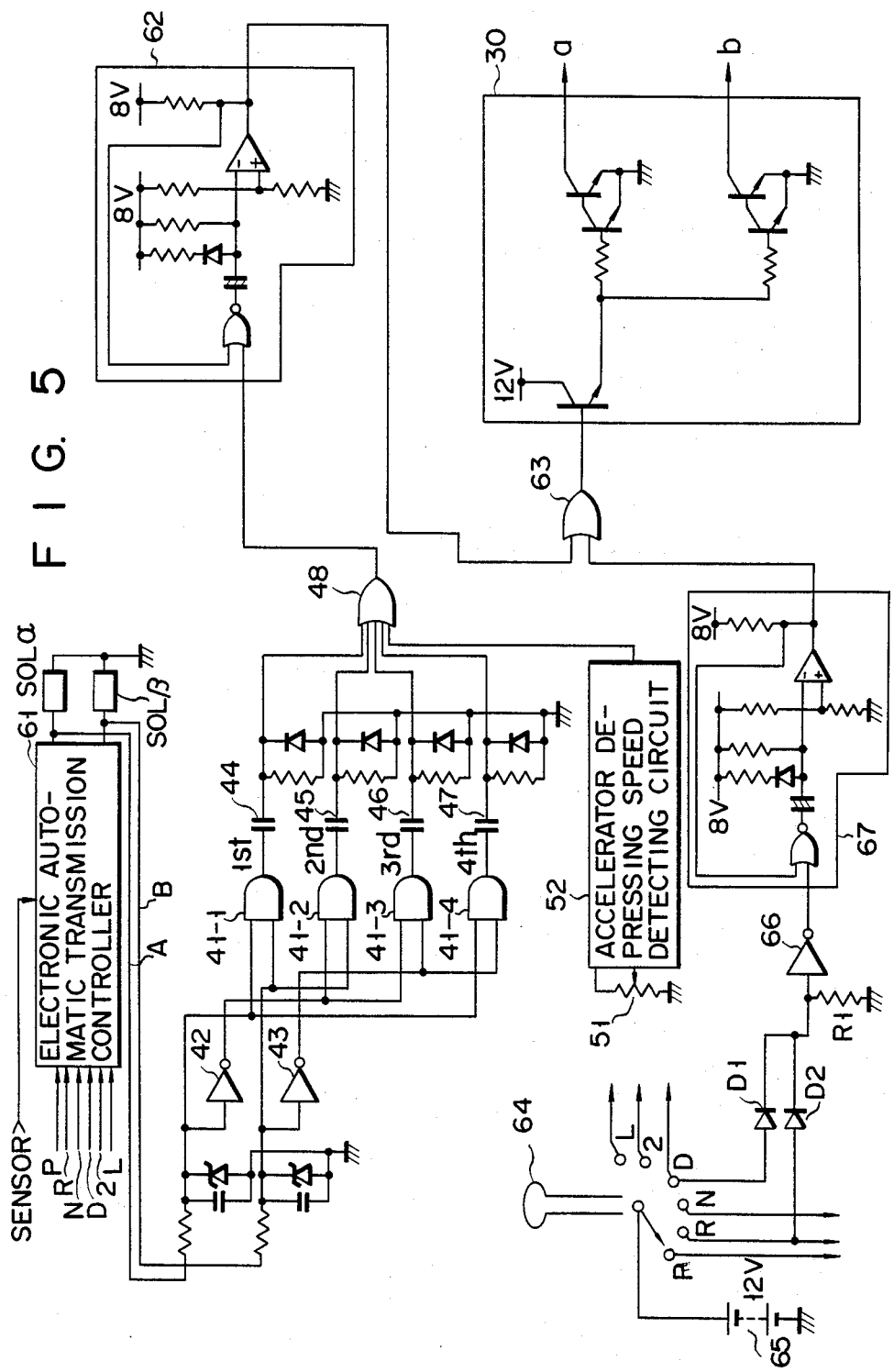
FIG. 5 shows the control circuit of another engine-roll control apparatus according to the invention.

FIG. 5 shows a control circuit used in a second engine-roll control apparatus according to the present invention. As shown in this figure, signals A and B are supplied to the solenoids α and β of an automatic electronic transmission controller 61. The controller 61 performs a gear change in accordance with the levels of these signals A and B. When both signals A and B are at a high level, the controller selects a first gear position. When the signals A and B are at low and high levels, respectively, it selects a second gear position. When both signals A and B are at a low level, it selects a third gear postion. When the signals A and B are at high and low levels, respectively, it selects the fourth gear position. Which gear position the controller 61 selects is detected by checking the levels of the signals A, B. The signal A is supplied to AND gates 41-1 and 41-4 directly, and to AND gates 41-2 and 41-3 through an inverter 42. The signal B is supplied to the AND gates 41-1 and 41-2 directly, and to the AND gates 41-3 and 41-4 through an inverter 43. Outputs from the AND gates 41-1 to 41-4 are supplied to an OR gate 48 via capacitors 44 to 47, respectively. An accelerator pedal angle sensor 51 is used to detect the angle of the accelerator pedal. Output from this sensor 51 is supplied to an accelerator depressing speed detecting circuit 52. The circuit 52 generates a high-level signal when the accelerator depressing speed, at which the accelerator opening is changed, exceeds a predetermined value. The circuit 52 has the same structure as the detecting circuit 52 shown in FIG. 4. Hence, when the driver quickly depresses the accelerator pedal, the circuit 52 generates a high-level signal. This high-level signal is supplied to the OR gate 48, which outputs a signal to a timer circuit 62. Upon receipt of a high-level signal, the timer circuit 63 generates a high-level signal for a predetermined period of time, T2. The high-level signal from the circuit 62 is supplied to a solenoid drive circuit 30 through an OR gate 63. In response to the high-level signal from the OR gate 63, the circuit 30 supplies the solenoid drive signal a to the shock absorber 7 and the solenoid drive signal b to the shock absorber 8.

When a selector lever 65 connected to the controller 61 is moved to a P (park), R (reverse), N (neutral), D (drive), 2 (second) or L (low) position, the power supply voltage from a battery 65 is applied to the P, R, N, D, 2 or L terminal. The D and R terminals are grounded through diodes D1 and D2, respectively, and then through a resistor R1. The voltage across the resistor R1 is applied to a timer circuit 67 through an inverter 66. The circuit 67 generates a high-level signal for a period of time, T1, after it has received the voltage. The high-level signal is supplied to the OR gate 63. It should be noted that the period T1 is equal to, or longer than, the period T2.

How the control circuit of FIG. 5 operates will now be explained. Suppose the electronic automatic transmission controller 61 changes from one of the four gear postions to another, and the accelerator depressing speed is lower than the predetermined vlaue. In this case, a low-level signal is supplied to the OR gate 48. As a result, a low-level signal is supplied to the timer circuit 67 from the OR gate 48. The circuit 67 supplies a low-level signal to the solenoid drive circuit 30 through the OR gate 63. Therefore, the circuit 30 produces neither a signal a nor a signal b. When the selector lever 64 is moved from the N position to the R or D position, a high-level signal is supplied to the inverter 66. The timer circuit 67 therefore receives a low-level signal. The low-level signal is supplied from the timer circuit 67 to the solenoid drive circuit 30 through the OR gate 63. In this case, too, the circuit 30 does not produce a signal a or a signal b.

After the controller 61 has changed from one gear position to another, or after the selector lever 64 has been moved from the N position to the R or D position, the solenoid drive circuit 30 will not be driven. Hence, both orifices 22 and 23 of either shock absorber (FIG. 1) are opened, so that the force for suppressing the back-and-forth motion of the engine 3 is small. But, this force is large enough to absorb the vibrations of the engine 3 which are small since the accelerator pedal has been depressed at a relatively low speed. As a result, the vibrations are not transmitted to the chassis 1.

On the other hand, when the electronic automatic transmission controller 61 changes from one gear position to another, and the accelerator pedal is depressed at a speed higher than the predetermined value, a high-level signal is supplied to the OR gate 48. This signal passes through the OR gate 48 to the timer circuit 62. The timer circuit 62 generates a high-level signal for the period T2. The solenoid drive circuit 30 therefore produces signals a and b for this period T2. During this period T2, the first orifice 22 of either shock absorber (FIG. 1) is closed. The damper effect on the back-and-forth motion of the engine body 3 therefore increases, whereby the vibrations of the engine 3 and transmission 5 are absorbed and do not reach the chassis 1.

When the selector lever 64 is moved from the N position to the R or D position, a low-level signal is temporarily supplied to the inverter 66. The inverter 66 outputs a high-level signal, which is supplied to the timer circuit 67. The circuit 67 produces a high-level signal for the period T1. The solenoid drive circuit 30 therefore generates signals a and b for this period T1. As a result, the first orifice 22 of either shock absorber (FIG. 1) is closed for the period T1. The damping effect on the back-and-forth motion of the engine body 3 increases.

In the second embodiment of the invention, when the electronic automatic transmission controller 61 changes from one of the four positions to another, or when the accelerator depressing speed exceeds the predetermiend value, the damping forces of the shock absorbers 7 and 8 increase for the period T2. On the other hand, when the selector lever 64 is moved from the N position to the R or D position, the damping forces of both shock absorbers 7 and 8 increase for the period T1 which is equal to, or longer than, the period T2. The shock absorbers 7, 8 absorb the vibrations of the engine 3 and transmission 5. Hence, vibrations are not transmitted to the chassis 1, in spite of the reaction to a large torque.

Figure 6:
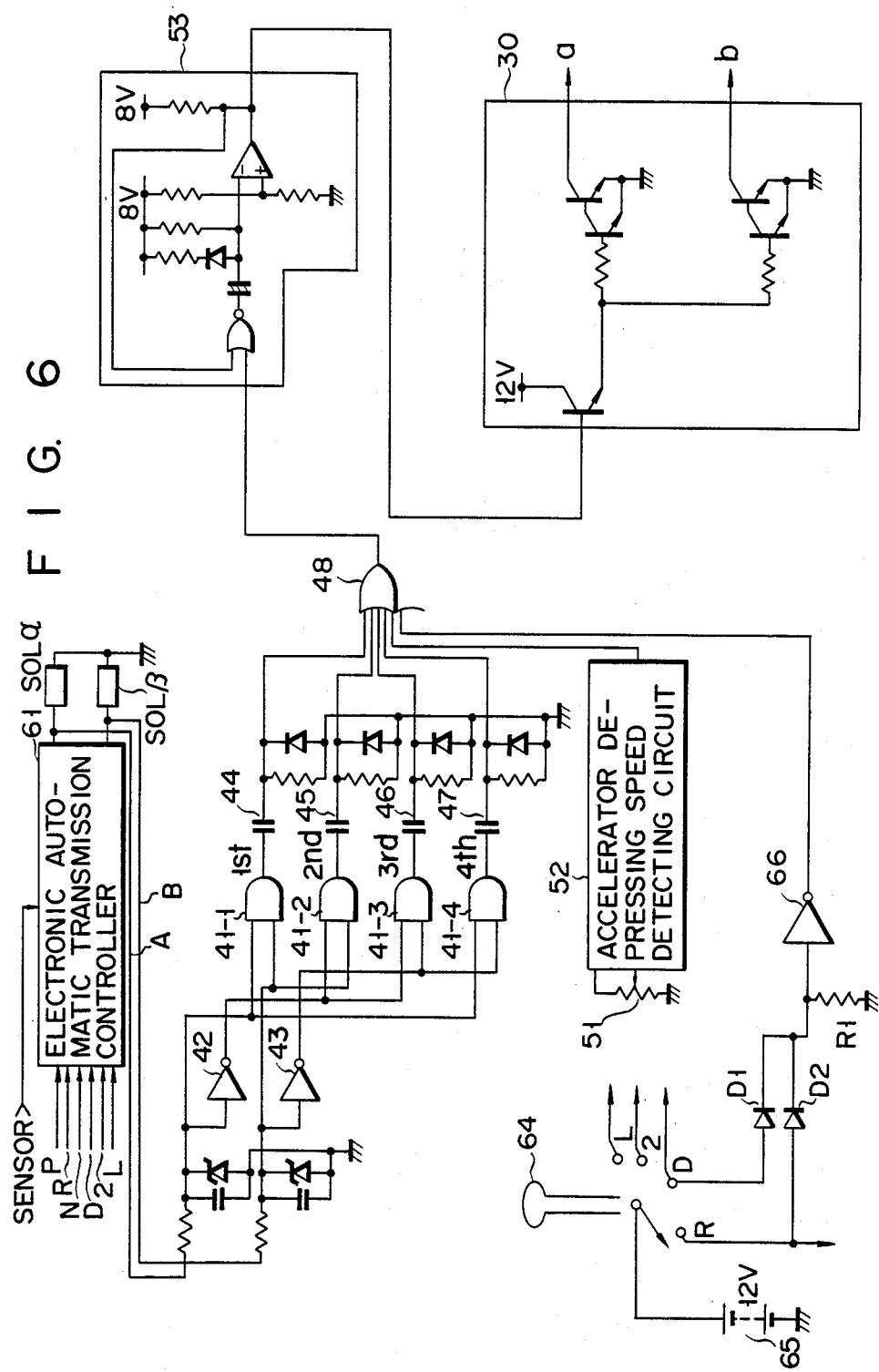
FIG. 6 illustrates the control circuit of still another engine-roll control apparatus according to a further embodiment of the invention.

FIG. 6 shows a control circuit used in a third embodiment of the present invention. As shown in this figure, signals A and B are supplied to two solenoids α and β connected to an electronic automatic transmission controller 61. The controller 61 performs a gear change in accordance with the levels of these signals A and B. When both signals A and B are at high level, the circuit selects a first gear position. When the signals A and B are low and high levels, respectively, it selects a second gear position. When both signals A and B are at a low level, it selects a third gear position. When the signals A and B are at high and low levels, respectively, it selects the fourth gear position. Which gear position the transmission assumes is detected by checking the levels of the signals A, B. The signal A is supplied to AND gates 41-1 and 41-4 directly, and to AND gates 41-2 and 41-3 through an inverter 42. The signal B is supplied to the AND gates 41-1 and 41-2 directly, and to the AND gates 41-3 and 41-4 through an inverter 43. Outputs from the AND gates 41-1 to 41-4 are supplied to an OR gate 48 via capacitors 44 to 47, respectively. An accelerator pedal angle sensor 51 is used to detect the angle of the accelerator pedal. An output from this sensor 51 is supplied to an accelerator depressing speed detecting circuit 52. The circuit 52 generates a signal at a high level when the accelerator depressing speed, at which the accelerator opening is changed, exceeds a predetermined value. The circuit 52 has the same structure as the detecting circuit 52 shown in FIG. 4. For example, when the driver quickly depresses the accelerator pedal, the circuit 52 generates a signal at a high level.

When a selector lever 64 connected to the controller 61 is moved to a R (reverse), D (drive), 2 (second) or L (low) position, the power supply voltage from a battery 65 is applied to a R, D, 2 or L terminal. The D and R terminals are grounded through diodes D1 and D2, respectively, and then through a resistor R1. The voltage across the resistor R1 is applied to a timer circuit 53 through an inverter 66 and the OR gate 48. The circuit 53 generates a high-level signal for a period of time, after it has received the voltage. The high-level signal from the circuit 53 is supplied to a solenoid drive circuit 30. In response to this high-level signal, the circuit 30 supplies the solenoid drive signal a to the shock absorber 7 (FIG. 1) and the solenoid drive signal b to the shock absorber 8 (FIG. 1).

The control circuit shown in FIG. 6 operates in the following manner. Suppose the electronic automatic transmission controller 61 has changed to one of the four gear positions to another and the selector lever has been moved to the R or D position. When the accelerator pedal is depressed at a speed below a predetermined value, all the signals supplied to the OR gate 48 are at a low level. The timer circuit 53 therefore receives a low-level signal. This low-level signal is supplied to the solenoid drive circuit 30. The solenoid drive circuit 30 outputs neither signal a nor signal b. In this case, both orifices 22 and 23 of either shock absorber (FIG. 1) are opened, so that the force for suppressing the back-and-forth motion of the engine body 3 is small. Nonetheless, this force is large enough to absorb the vibrations of the engine body 3 which are small since the accelerator has been depressed at a relatively low speed. As a result, the vibrations are not transmitted to the chassis 1.

On the other hand, when the controller 61 selects a new gear and the accelerator pedal is depressed at a speed higher than the predetermined value, or when the selector lever 64 is moved to the R position or the D position, the first orifice 22 of either shock absorber (FIG. 1) is closed. Therefore, the damper effect on the back-and-forth motion of the engine 3 increases, whereby the vibrations of the engine 3 are absorbed.

FIG. 7 shows a control circuit used in a fourth embodiment of the present invention. This circuit comprises a battery 71, an ignition switch 72 with an IG (ignition) terminal. A series circuit of a brake switch 73 and a brake lamp 74 is connected to the IG terminal of the switch 72. The brake switch 73 is closed when a brake pedal (not shown) is depressed. The brake lamp 74 is turned on when the brake switch 73 is thus closed. The node between the switch 73 and lamp 74 is connected to one end of a relay coil 75. The other end of this coil 75 is grounded. When the relay coil 75 is energized by closing the brake switch 73, a relay switch 75s is closed. Voltage V1 (e.g., 8V) is applied to one terminal of the relay switch 75s through a registor R1. The node between the resistor R1 and delay switch 75s is connected to a timer circuit 53 by an inverter 76. The timer circuit 53 generates a high-level signal for a predetermined period of time after it has received the high-level signal. The high-level signal from the timer circuit 53 is supplied to a solenoid drive circuit 30. In response to this high-level signal, the circuit 30 generates signals a and b which are supplied to the shock absorbers 7 and 8, respectively.

The control circuit shown in FIG. 7 operates in the following manner. Suppose the driver turns on the ignition switch 72, thus closing the IG terminal and starting the engine 2, and depresses the acceleration pedal (not shown). Until the driver depresses the brake pedal (not shown) to start the FF car, the brake switch 73 remains open, and the relay switch 75s also stays open. As long as the switch 75s remains open, voltage V1 (i.e., a high-level signal) is applied to the inverter 76, which outputs a low-level signal to the timer circuit 53. The timer circuit supplies a low-level signal to the solenoid drive circuit 30. The circuit 30 produces neither a signal a nor a signal b. As a result, both orifices 22 and 33 of either shock absorber (FIG. 1) remain open, whereby the damper effect on the back-and-forth motion of the engine body 3 is small. Nonetheless, the damper effect is large enough to absorb the vibration of the engine 3 since the vibrations are small, unlike the vibrations which may be caused when the driver depresses the brake pedal. Hence, the shock absorbers 7 and 8 absorb the vibrations, and the vibrations are not transmitted to the chassis 1.

When the driver depresses the brake pedal, the brake switch 73 is closed. The excitation current flows through the relay coil 75l, which closes the relay switch 75s. Once the switch 75s has been closed, the ground potential (i.e., a low-level signal) is applied to the inverter 76. The inverter 76 supplies a high-level signal to the timer circuit 53. The circuit 53 produces a high-level signal for a predetermined period of time. Therefore, the solenoid drive circuit 30 generates a signal a and a signal b during this period. The first orifice 22 of either shock absorber (FIG. 1) is thus closed, whereby the damper effect on the back-and forth motion of the engine body 3 increases. Therefore, the damping forces of the shock absorbers 7 and 8 are large during the period after the brake pedal has been depressed.

Figure 8:
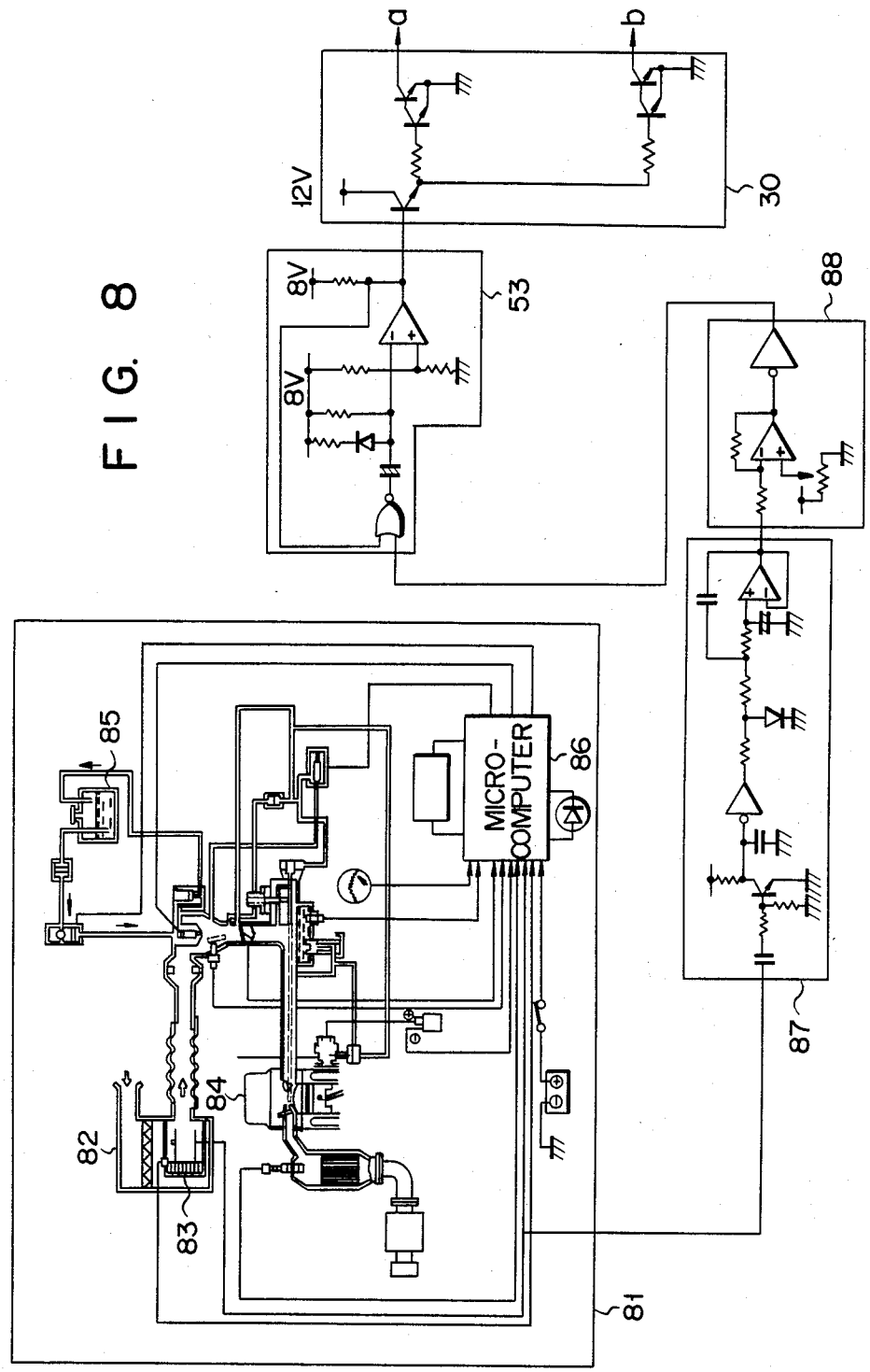
FIG. 8 indicates the control circuit of further engine-roll control apparatus according to the present invention.

A fifth embodiment of the invention may be described with reference to FIG. 8. This embodiment is used in combination with an electronic fuel injection control apparatus 81 designed to ensure an optimum fuel injection in accordance with the state of an FF car. The apparatus 81 comprises an air cleaner 82 and a microcomputer 86. The air cleaner 82 has an airflow sensor 83 which utilizes von Karman's vortex street to detect the flow rate of intake air into an engine 84. The sensor 83 generates pulses at a frequency which varies with the flow rate of intake air. The output pulses of the sensor 83 are supplied to the microcomputer 86 and also to a frequency-to-voltage converter 87. This converter 87 generates voltage corresponding to the frequency of the input signal, i.e., the flow rate of the intake air. The voltage is compared by a comparator 88 with the reference voltage. The comparator 88 generates a high-level signal when the voltage is higher than the reference voltage. This high-level signal is supplied to a timer circuit 53. The timer circuit 53 generates a high-level signal for the predetermined period of time after it has received the input high-level signal. The output from the timer circuit 53 is supplied to a solenoid drive circuit 30. The circuit 30 generates signals a and b for a predetermined period of time, which are respectively supplied to the shock absorber 7 and 8 (FIG. 1).

The operation of the fifth embodiment shown in FIG. 8 will be described. The flow rate of intake air is detected by the airflow sensor 83. The output signal of the sensor 83, which represents this flow rate, is converted by the converter 87 to a voltage which also corresponds to the flow rate. The voltage is then supplied to the comparator 88. When the voltage is lower than the reference value (i.e., the predetermined flow rate of intake air), the comparator 88 generates a low-value signal. In this case, the timer circuit 53 generates a low-level signal. The solenoid drive circuit 30 produces neither a signal a nor a signal b. Therefore, when the intake airflow rate is lower than the predetermined value, both orifices 22 and 23 of either shock absorber (FIG. 1) are opened, whereby the damper effect on the back-and-forth motion of the engine 3 decreases. On the other hand, when the intake airflow rate exceeds the predetermined value, comparator 88 generates a high level signal. Hence, the timer circuit 53 also produces a high-level signal for a predetermined period of time. As a result, the solenoid drive circuit 30 produces signals a and b for this period of time. In this case, the first orifice 22 of either shock absorber (FIG. 1) is closed, whereby the damper effect increases. Hence, the shock absorbers a and b fully absorb the vibrations of the engine 3, though the vibrations are great since the flow rate of intake air is large.

What is claimed is:

1. An apparatus for controlling the rolling of the engine of an automobile, comprising:
   detecting means for detecting that changes have been achieved by an automatic transmission in lever position and gear position;
   engine-roll control means for controlling the rolling of the engine;
   a drive mechanism for driving the engine-roll control means; and
   a drive circuit for actuating the drive mechanism for a predetermined period of time in response to an output signal from the detecting means.

2. An apparatus according to claim 1, wherein said detecting means detects that drive position or reverse position has been selected for the lever position.

3. An apparatus according to claim 1, wherein said engine-roll control means comprises:
   a casing filled with liquid, thus forming a liquid chamber;
   a partition secured to the engine and dividing said liquid chamber into two sections;
   fastening means for fastening that wall of said casing which faces the partition to the chassis of the automobile;
   an orifice member comprising at least one orifice made in said partition and a rotary valve for adjusting the opening of the orifice; and
   a drive mechanism for rotating said rotary valve.

4. The apparatus according to claim 1, wherein said engine-roll control means comprises:
   a casing filled with liquid, thus forming a liquid chamber;
   a partition secured to the chassis of the automobile and dividing said liquid chamber into two sections;
   fastening means for fastening that wall of said casing which faces the partition to the engine;
   an orifice member comprising at least one orifice made in said partition and a rotary valve for adjusting the opening of the orifice; and
   a drive mechanism for rotating said rotary valve.

5. An apparatus according to claim 1, which further comprises speed detecting means for detecting that an accelerator pedal has been depressed at a speed above a predetermined value, and in which said drive mechanism is actuated for a predetermined period of time in response to an output signal from one of said detecting means and said speed detecting means.

6. An apparatus according to claim 5, wherein said detecting means detects that drive position or reverse position has been selected for the lever position.

7. An apparatus according to claim 5, wherein said drive circuit actuates said drive mechanism for a period T1 when said detecting means detects that drive position or reverse position has been selected for the lever position and for a period T2 when said detecting means detects that a change has been achieved in gear position.

8. An apparatus according to claim 5, wherein said drive circuit actuates said drive mechanism for a period T1 when said detecting means detects that drive position or reverse position has been selected for the lever position and for a period T2 when said speed detecting means detects that an accelerator pedal has been depressed at a speed above a predetermined value.

9. An apparatus according to claim 5, further comprising a brake switch which closes when a brake pedal is depressed, and said drive circuit actuates said drive mechanism for a predetermined period of time in response to an output signal from one of the brake switch, detecting means and speed detecting means.

10. An apparatus according to claim 5, which further comprises another speed detecting means for detecting the speed at which air flow rate changes, and in which said drive circuit actuates said drive mechanism for a predetermined period of time in response to an output signal from said second speed detecting means.

* * * * *